(12) United States Patent
Freeborg et al.

(10) Patent No.: US 11,078,669 B2
(45) Date of Patent: Aug. 3, 2021

(54) APPLYING A RELEASE MATERIAL TO A SHINGLE DURING MANUFACTURING

(71) Applicant: TAMKO Building Products LLC, Galena, KS (US)

(72) Inventors: Chris Freeborg, Irving, TX (US); Kyle Davis, Irving, TX (US); Alex Alekhine, Irving, TX (US); David Humphreys, Galena, KS (US)

(73) Assignee: TAMKO Building Products LLC, Galena, KS (US)

( * ) Notice: Subject to any disclaimer, the term of this patent is extended or adjusted under 35 U.S.C. 154(b) by 38 days.

(21) Appl. No.: 16/288,470

(22) Filed: Feb. 28, 2019

(65) Prior Publication Data

US 2019/0271160 A1    Sep. 5, 2019

Related U.S. Application Data

(60) Provisional application No. 62/638,799, filed on Mar. 5, 2018.

(51) Int. Cl.
| | |
|---|---|
| *E04D 1/20* | (2006.01) |
| *B05C 5/02* | (2006.01) |
| *B32B 11/02* | (2006.01) |
| *E04D 1/00* | (2006.01) |
| *E04D 5/10* | (2006.01) |
| *B32B 37/24* | (2006.01) |
| *B32B 11/04* | (2006.01) |

(52) U.S. Cl.
CPC .................. *E04D 1/20* (2013.01); *B05C 5/02* (2013.01); *B32B 11/02* (2013.01); *B32B 11/04* (2013.01); *B32B 37/24* (2013.01); *E04D 5/10* (2013.01); *E04D 2001/005* (2013.01)

(58) Field of Classification Search
None
See application file for complete search history.

(56) References Cited

U.S. PATENT DOCUMENTS

| | | | |
|---|---|---|---|
| 4,055,453 A * | 10/1977 | Tajima | ....................... E04D 5/10 156/279 |
| 4,287,248 A | 9/1981 | Gessner et al. | |
| 4,804,696 A | 2/1989 | Jolitz et al. | |
| 5,026,747 A | 6/1991 | Jolitz et al. | |
| 5,102,438 A | 4/1992 | Grabowski | |
| 5,571,596 A | 11/1996 | Johnson | |
| 6,027,568 A * | 2/2000 | Wallace | ................ B05B 12/122 118/324 |
| 6,207,593 B1 | 3/2001 | Fields | |
| 6,228,785 B1 | 5/2001 | Miller et al. | |
| 6,709,994 B2 | 3/2004 | Miller et al. | |
| 7,442,658 B2 | 10/2008 | Rodrigues et al. | |

(Continued)

*Primary Examiner* — Binu Thomas

(74) *Attorney, Agent, or Firm* — Cochran Freund & Young LLC; William W. Cochran

(57) ABSTRACT

Disclosed is a release material that can be applied as a liquid, gel, emulsion, foam, etc. in a shingle manufacturing line. The release material can also be used in the manufacturing of roll roofing. The release material primarily constitutes an emulsion of polymers that can be cured with heat, IR light or other methods. Silicone may also be included in the emulsion which assists in releasability. The release material can be sprayed or extruded on to the surface of the shingle in an automated fashion, eliminating the necessity for operator interaction.

5 Claims, 5 Drawing Sheets

(56) References Cited

U.S. PATENT DOCUMENTS

| | | |
|---|---|---|
| 7,670,668 B2 | 3/2010 | Greaves et al. |
| 7,836,654 B2 | 11/2010 | Belt et al. |
| 8,226,790 B2 | 7/2012 | Rodriques et al. |
| 8,231,443 B1 | 7/2012 | Tomcak et al. |
| 8,240,102 B2 | 8/2012 | Belt et al. |
| 8,623,164 B2 | 1/2014 | Belt et al. |
| 8,802,215 B2 | 8/2014 | Kalkanoglu et al. |
| 9,010,058 B2 | 4/2015 | DeJarnette et al. |
| 9,242,432 B1 | 1/2016 | Harrington, Jr. et al. |
| 9,441,140 B2 | 9/2016 | Zhou et al. |
| 9,447,581 B2 | 9/2016 | Harrington et al. |
| 9,605,434 B2 | 3/2017 | Belt et al. |
| 2005/0053745 A1* | 3/2005 | Bartek ............... B32B 11/00 428/40.1 |
| 2005/0130519 A1* | 6/2005 | Rodrigues ........... B32B 37/08 442/54 |
| 2009/0011675 A1* | 1/2009 | Ratcliff ............... B32B 37/08 442/327 |
| 2010/0192501 A1* | 8/2010 | Koch .................. E04D 1/20 52/557 |
| 2014/0272244 A1 | 9/2014 | Harrington, Jr. et al. |
| 2015/0218823 A1 | 8/2015 | Shiao et al. |
| 2015/0239005 A1* | 8/2015 | Humphreys ......... E04D 1/20 427/421.1 |
| 2015/0240494 A1 | 8/2015 | Kiik et al. |
| 2017/0067257 A1 | 3/2017 | Zhou et al. |
| 2017/0158440 A1 | 6/2017 | Belt et al. |
| 2017/0291384 A1* | 10/2017 | Hyer .................. B32B 5/022 |

\* cited by examiner

APPLYING A RELEASE MATERIAL TO A SHINGLE DURING MANUFACTURING

CROSS-REFERENCE TO RELATED APPLICATION

This Non-Provisional patent application claims the benefit of the Provisional U.S. Patent Application No. 62/638,799, entitled "Liquid Release Tape for Asphalt Roofing," which was filed with the U.S. Patent & Trademark Office on Mar. 5, 2018, which is specifically incorporated herein by reference for all that it discloses and teaches.

BACKGROUND OF THE INVENTION

Asphalt roofing provides inexpensive and effective protection of roofs. Asphalt roofing typically comprises a substrate material that is coated with asphalt. Granules or other materials can be used to provide aesthetics to the roofing material and increase protection of the asphalt roofing. Consequently, modern asphalt roofing has provided a reliable, aesthetic and inexpensive product for protecting roofs and repelling moisture.

SUMMARY OF THE INVENTION

An embodiment of the present invention may therefore comprise a method of applying a release material to the surface of a shingle during manufacturing of the shingle comprising: obtaining a liquid release material which comprises a liquid or gel silicon polymer emulsion that cures as a waterproof elastic film; placing dispensers over an asphalt coated substrate at one or more locations on the surface of the shingle that are aligned with adhesive on adjacent shingles when the shingle is placed in a bundle; dispensing the liquid release material on the surface of the shingle from the dispensers after asphalt has been applied to both a top and bottom surface of a substrate.

An embodiment of the present invention may also comprise a system for applying a release material to the surface of a shingle during manufacturing of the shingle comprising: an asphalt coater that coats both a top surface and a bottom surface of a shingle substrate with asphalt; a storage tank that stores a liquid release material which comprises a liquid or gel silicon polymer emulsion that cures as a waterproof elastic film; dispensers connected to the storage tank that dispense the liquid release material at specific locations on the surface of the shingle that align with adhesive on an adjacent shingle when the shingle is placed in a bundle.

DETAILED DESCRIPTION OF THE EMBODIMENTS

Figure 1:
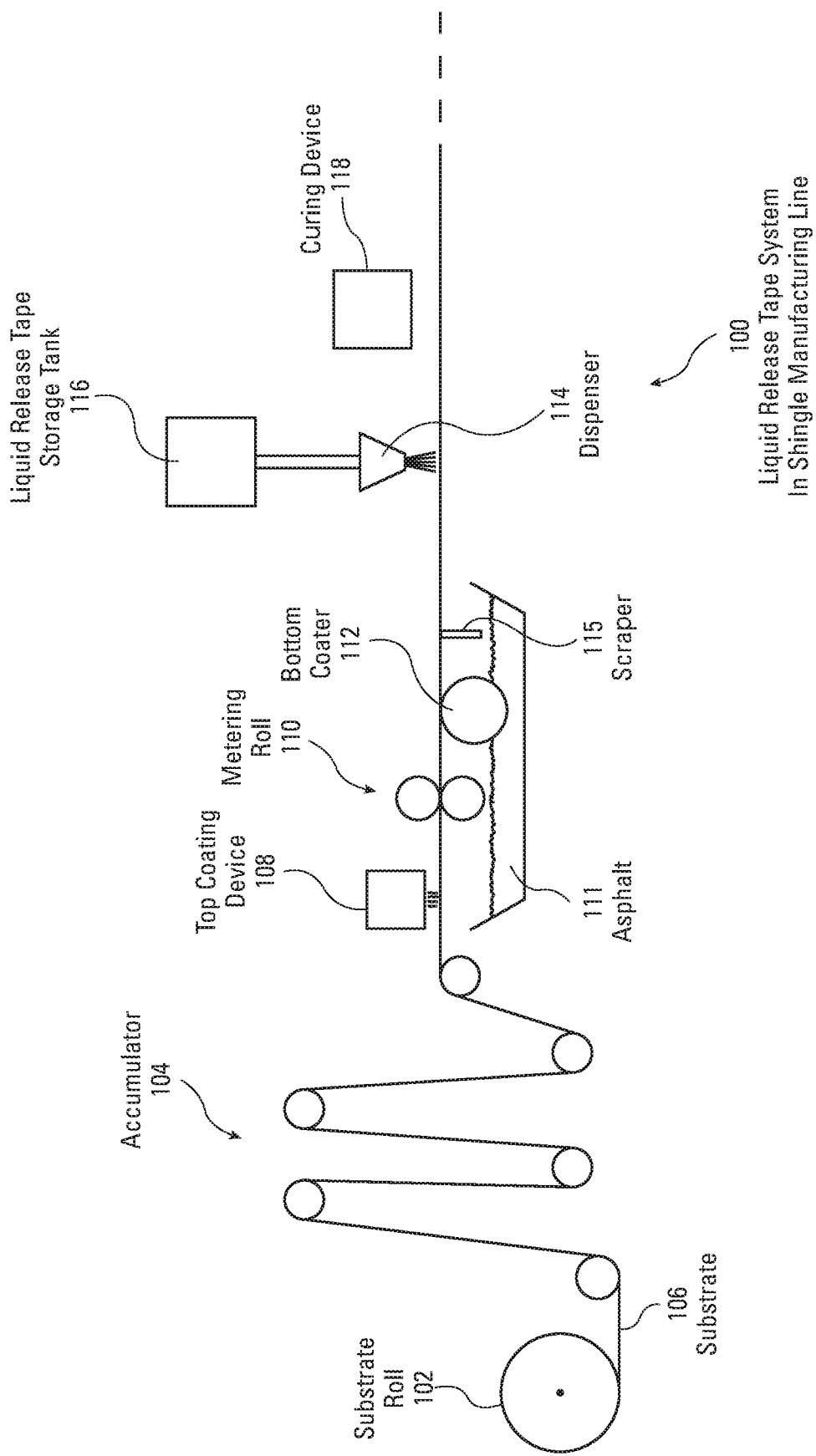
FIG. 1 is a schematic side view of a liquid release tape system in a shingle manufacturing line.

FIG. 1 is a schematic side view illustrating an embodiment of a liquid release tape system 100 in a shingle manufacturing line. As shown in FIG. 1, a substrate roll 102 provides a substrate 106 that is fed to the accumulator 104. The substrate 106 may comprise a sheet of fiber glass, fibrous material, polyester, polymer or other suitable substrate materials for use with asphalt roofing. The accumulator 104 accumulates the substrate 106 so that when the substrate roll 102 is depleted, another substrate roll can be attached to the end of the substrate of the previous substrate roll without interrupting the flow of the manufacturing line. As such, the shingle manufacturing line illustrated in FIG. 1 can continue to operate since the substrate 106 will be fed from the accumulator 104. The substrate 106 is then directed to a top coating device 108 as the substrate 106 leaves the accumulator 104. The top coating device 108 applies a layer of asphalt, such as coating asphalt 111 that may include a filler material. Typically the filler material is a ground, pulverized limestone. The top coating device 108 coats the substrate 106 along the top surface prior to entering the metering rolls 110. The metering rolls 110 control the amount of asphalt that remains on the top layer of the substrate 106. Excess asphalt returns to the container of the coating asphalt 111. The substrate 106, after it is coated with a top asphalt layer, proceeds to a bottom coating device 112. The bottom coating device 112 applies the coating asphalt 111 to the bottom surface of the substrate 106, as illustrated in FIG. 1. A scraper device 115 may be used to remove excess asphalt from the bottom surface of the substrate 106 after the asphalt is applied by the bottom coating device 112. The scraper is positioned at a location that scrapes the asphalt coated substrate 119, after the bottom coating device 112 has applied asphalt to the bottom surface of the substrate 106. The asphalt coated substrate 119 then proceeds to a dispenser 114. The dispenser 114 is connected to a storage tank 116 that stores the liquid release material. The liquid release material is dispensed by dispenser 114 along a line or stripe of the top surface of the asphalt coated substrate 119. The dispenser 114 that dispenses the liquid release material may comprise a sprayer, an extruder, a roll applicator including a direct roll coating applicator, a kiss coating or inking coating applicator, a gravure coating applicator or a reverse roll coating applicator. The dispenser may also include a knife applicator, which is also referred to as a blade coater. Similarly, the dispensers in the other embodiments of this application, including the liquid tape dispenser 228 of FIG. 2 and the liquid tape dispenser 326 of FIG. 3, dispensers 408, 410 of FIG. 4 and dispensers 508, 510 of FIG. 5, may also include these various types of dispensers, or other dispensers that are known in the art. As the asphalt coated substrate 119 moves, the curing device 118 cures the liquid release material. The liquid release material can be cured by heating or other methods such as UV radiation, depending upon the type of liquid release material that is used. Consequently, the curing device 118 may be a heater, which blows hot air onto the surface of the asphalt coated substrate 119, an IR radiation generator, a UV radiation generator, or other type of curing device.

The liquid release material 116 that is sprayed by the dispenser 114, as illustrated in FIG. 1, may comprise liquid emulsions having a trade name "Andisil" that are available from AB Specialty Silicones, 3790 Sunset Ave, Waukegan, Ill. 60087. Andisil EM 4056 is a silicone emulsion that cures to a durable, weatherproof, waterproof, heat-resistant elastic film at ambient temperatures. The product will adhere to many different substrates, including textiles, concrete, brick, stucco, wood and ceramics, and has excellent water repellency and durability. Andisil EP is another liquid release material that can be used. Andisil EP products are anionic emulsions of high molecular weight silicone polymers. The Andisil EP products are polymerized in an emulsion form so that the resultant polymers have properties not attained through a typical mechanical emulsion process. The Andisil EP products are pourable liquids that provide a convenient delivery for high viscosity polymers. The Andisil EP is an anionic surfactant that provides in-use properties that are not attained with non-anionic surfactants. Various other types of liquid release materials can be used. As indicated above, the liquid release materials described above are liquids at ambient temperature. However, any type of emulsified polymer, or other various types of polymers, and silicones can be used including gels, foams, etc. which may require an extruder rather than a sprayer. For purposes of this application, the term sprayer shall include extruders, squirters, ejectors, decorators, emitters, etc.

Some shingle making processes place a release tape on the asphalt shingle that is aligned with a sealant material placed on an adjacent shingle. This prevents the shingle with the release tape from adhering to the other shingle. During the manufacturing process, a strip of sealant material is applied to the shingle, typically on the back surface of the shingle, to adhere to the surface of a roof when installed. Additionally, sealant strips can be placed in other locations to adhere to other shingles that are installed on the roof. When shingles are manufactured, they are placed in bundles, which are stacks of shingles. These bundles may be stacked outside and subject to environmental conditions such as high heat. It is advantageous to have a release tape placed on adjacent shingles in the bundle so that the adhesive strip does not cause the shingles to stick together. In some applications, a polyethylene terephthalate (PET) film is laid on the surface of the shingle at a location that will be aligned with the adhesive stripe on an adjacent shingle in the stack of shingles. The PET tape may include a non-stick coating that prevents the sealant from an adjacent shingle from adhering to the shingle surface. The placement of a PET tape along the surface of a shingle during the shingle manufacturing process is somewhat difficult and requires tape changes, which necessitate human intervention. In addition, tape related quality issues may exist, such as tape flip, stretch, misalignment, etc. The use of a liquid release material eliminates many of these problems of using a PET tape. Liquid release materials applied to the shingle reduces waste and provides for full automation of this portion of the shingle manufacturing line by removing the necessity for human interaction.

Figure 2:
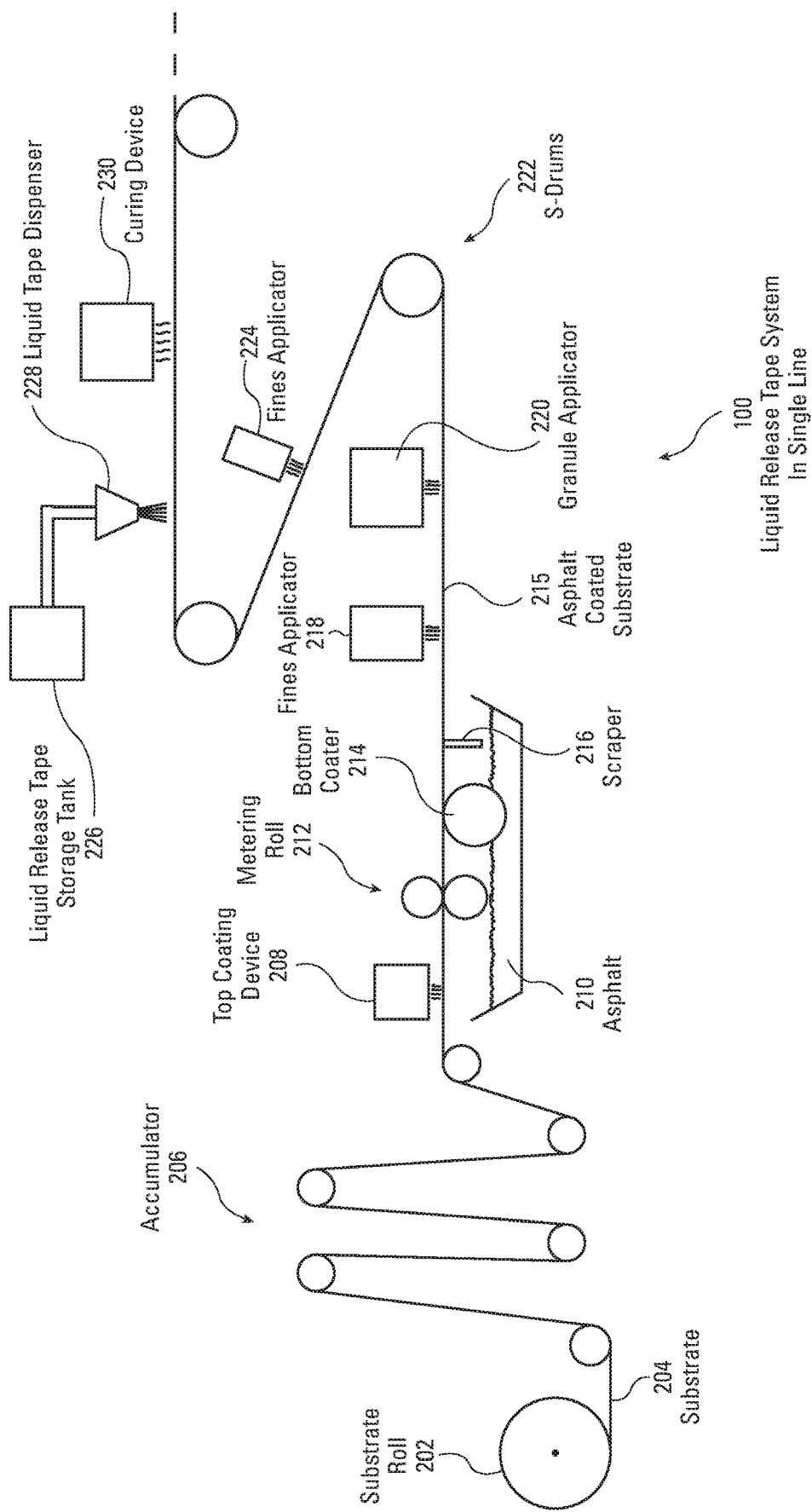
FIG. 2 is a schematic side illustration of another embodiment of a liquid release tape system in a shingle manufacturing line.

FIG. 2 is a schematic side view of another embodiment of a liquid release tape system 200 for a shingle manufacturing line. As illustrated in FIG. 2, a substrate roll 202 is a roll of substrate material 204 that is fed into an accumulator 206. The substrate 204 then proceeds to the top coating device 208. The top coating device 208 applies a top coating of asphalt to the substrate 204. Metering rolls 212 control the thickness of the asphalt top layer on the substrate 204. After the top coat of asphalt has been applied to the substrate 204 and metered by metering rolls 212, a bottom coat of asphalt is applied by bottom coater 214, as illustrated in FIG. 2. The bottom coater 214 coats the bottom surface of the substrate 204 with coating asphalt 210, which includes a filler such as powdered limestone. A scraper 216 can also be used to control the thickness of the asphalt on the bottom surface. A fines applicator then applies fines to the top surface of the asphalt coated substrate 215. Granule applicator 220 then applies granules to the top surface. In order to displace the headlap granules and any of the granules that are to be applied in locations where the release material will be applied to the surface of the shingle, fines such as small particle sand, ground limestone or other types of fines, is initially applied by the fines applicator 218. The liquid release tape material can then be applied directly over the fines, as disclosed below.

Once the fines and granules are applied, as shown in FIG. 2, the sheet proceeds to the S-Drums 222. Fines applicator 224 applies fines to the back side of the asphalt coated substrate 215. After the S-Drums, the sheet proceeds to the liquid tape dispenser 228, which applies one or more strips or spots of liquid release material to the surface of the sheet from the liquid tape storage tank 226. The liquid release material may simply cure from the heat of the asphalt, or an optional curing device 230 can be used. The curing device 230 may comprise a hot air blower, an IR radiant heater, an electric radiant heater and/or a UV curing device, depending upon the type of liquid release material used. The sheet then moves towards the rest of the shingle manufacturing line 200. Application of the liquid release materials at the location illustrated in FIG. 2, which is spaced from the asphalt coaters, increases the resolution and placement of the liquid release materials. However, the liquid tape dispenser 228 may be placed in various locations in the manufacturing line.

Figure 3:
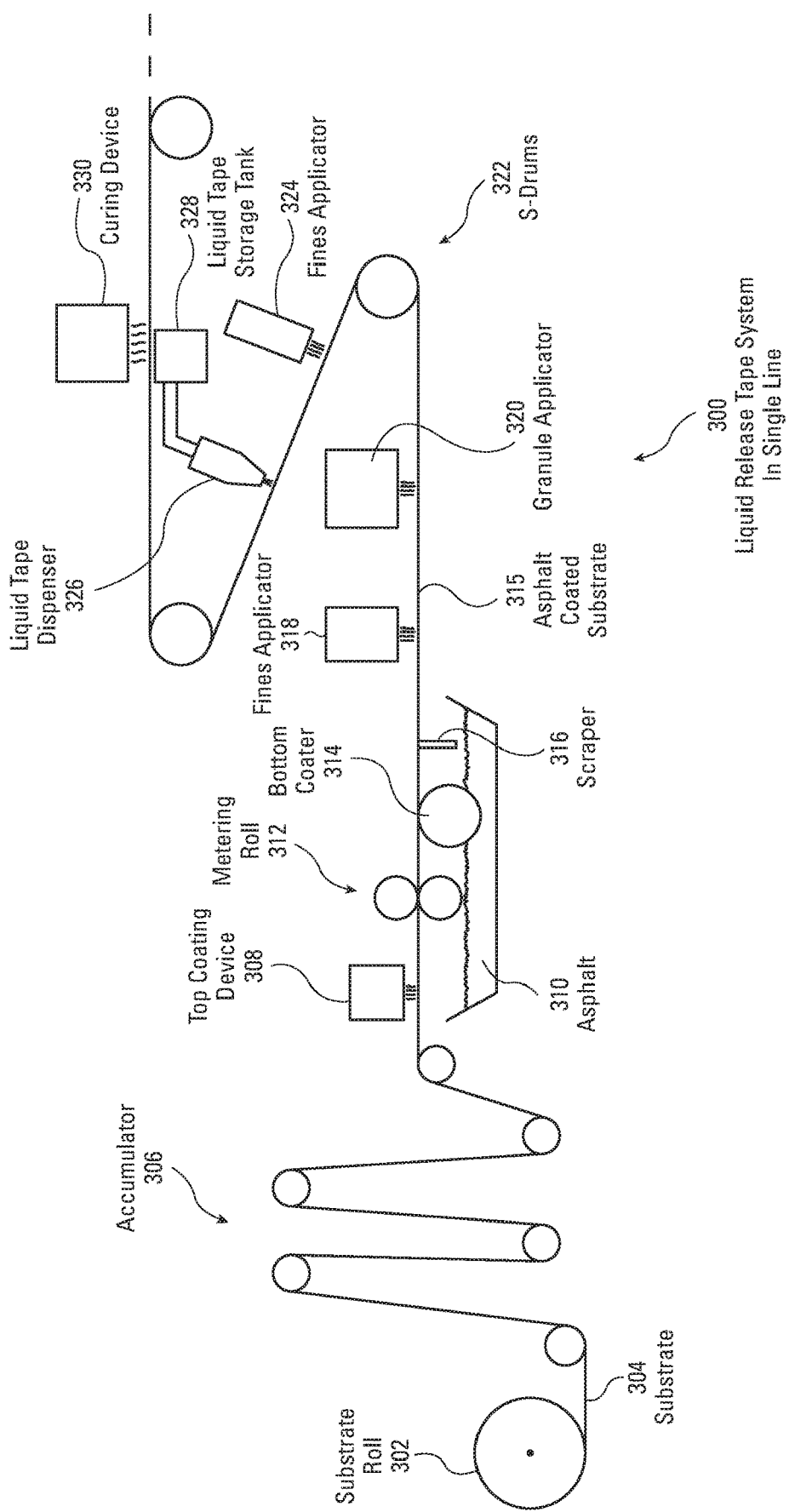
FIG. 3 is a schematic side view of another embodiment of a liquid release tape system that can be used in a shingle manufacturing line.

FIG. 3 is a schematic side view of another embodiment of a liquid release tape system 300 that can be used in a shingle manufacturing line. As illustrated in FIG. 3, substrate roll 302 provides a substrate 304 that is fed to accumulator 306. The substrate then proceeds to top coating device 308, which coats the top of the substrate 304 in a curtain flow of asphalt that covers the substrate 304. Metering rolls 312 control the thickness of the asphalt 310 that is applied to the substrate 304. Bottom coater 314 coats the bottom surface of the substrate 304. Scraper 316 controls the thickness of the asphalt on the bottom surface of the substrate 304. Fines applicator 318 then applies fines to the top surface of the asphalt coated substrate 315. Granule applicator 320 then applies granules to the top surface. As indicated above, the granules will adhere to the asphalt coated substrate 315 in the portions of the top surface of the asphalt coated substrate 315 that are not coated with fines. The asphalt coated substrate then proceeds to S-Drums 322. A fines applicator 324 can optionally be provided, which places fines on the bottom surface of the asphalt coated substrate 315. Liquid tape dispenser 326 then applies the liquid tape from the liquid tape storage tank 328 to the back side of the asphalt coated substrate 315. If fines applicator 324 is not utilized, the liquid tape dispenser 326 applies the liquid tape directly to the asphalt on the backside of the asphalt coated substrate 315. The substrate then proceeds around the S-Drums 322 and to an optional curing device 330. The substrate then proceeds to the remaining portion of the shingle manufacturing line.

Figure 4:
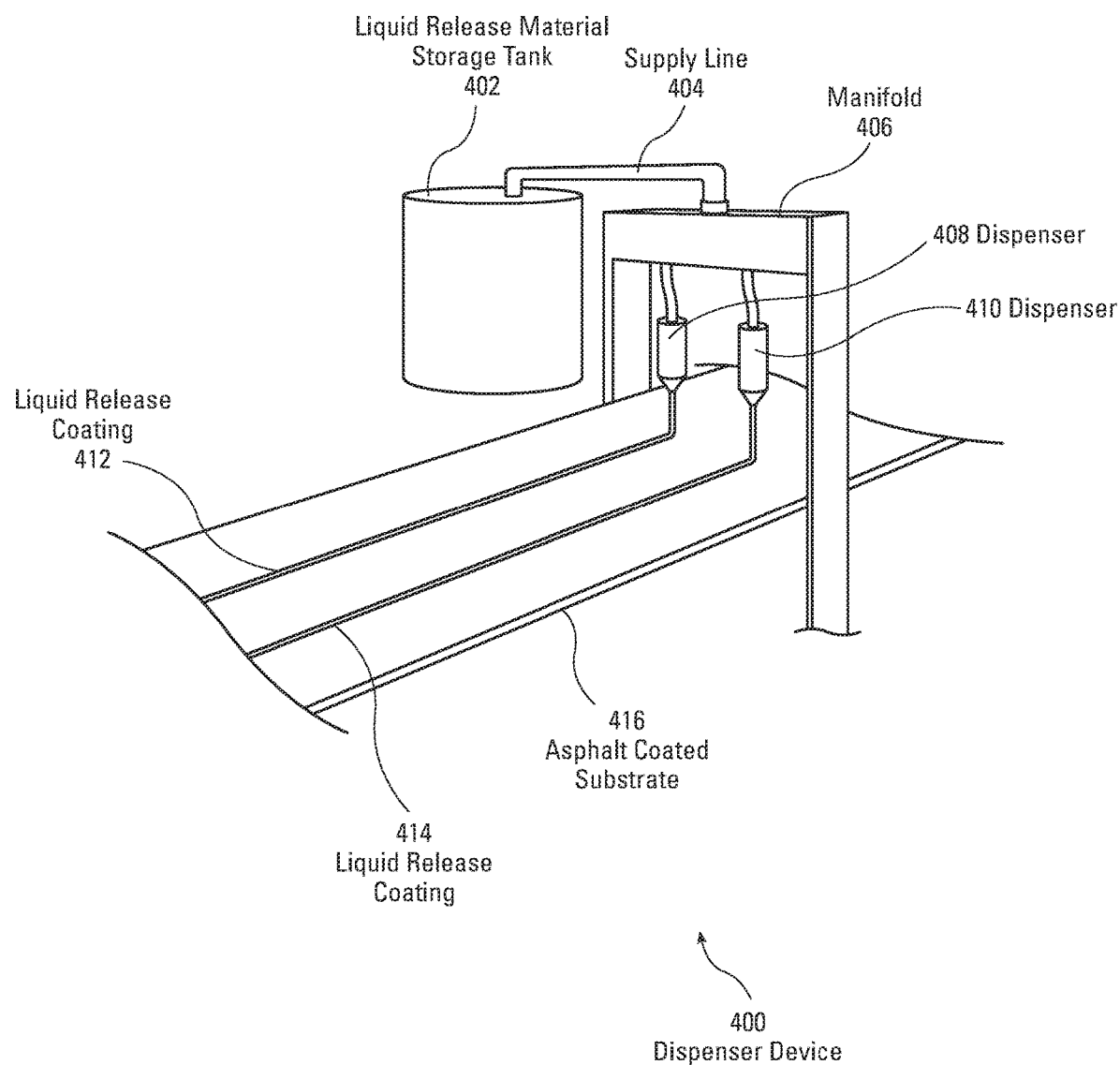
FIG. 4 is a perspective view illustrating the manner in which the dispenser device operates and applies a liquid release tape coating to an asphalt coated substrate.

FIG. 4 is a schematic isometric view of an embodiment of a Dispenser 400. As illustrated in FIG. 4, the asphalt coated substrate 416 is moving from the right side of the figure to the left side of FIG. 4. A liquid release material storage tank 402 stores the liquid release material and transmits the liquid release material through supply line 404 to a manifold 406. Dispenser 408 and dispenser 410 are connected to the manifold 406, and spray or extrude the liquid release material on to the surface of the asphalt coated substrate 416. As illustrated in FIG. 4, a strip of liquid release coating 412 and liquid release coating 414 is placed on the asphalt coated substrate 416 and are cured by the heat of the asphalt. Although the liquid release coating 412 is shown as a continuous stripe of material, the material can be placed in accordance with any desired geometry, including short stripes, dots or circles, or any desired design that matches the adhesive deposits on adjacent shingles in a stack.

Figure 5:
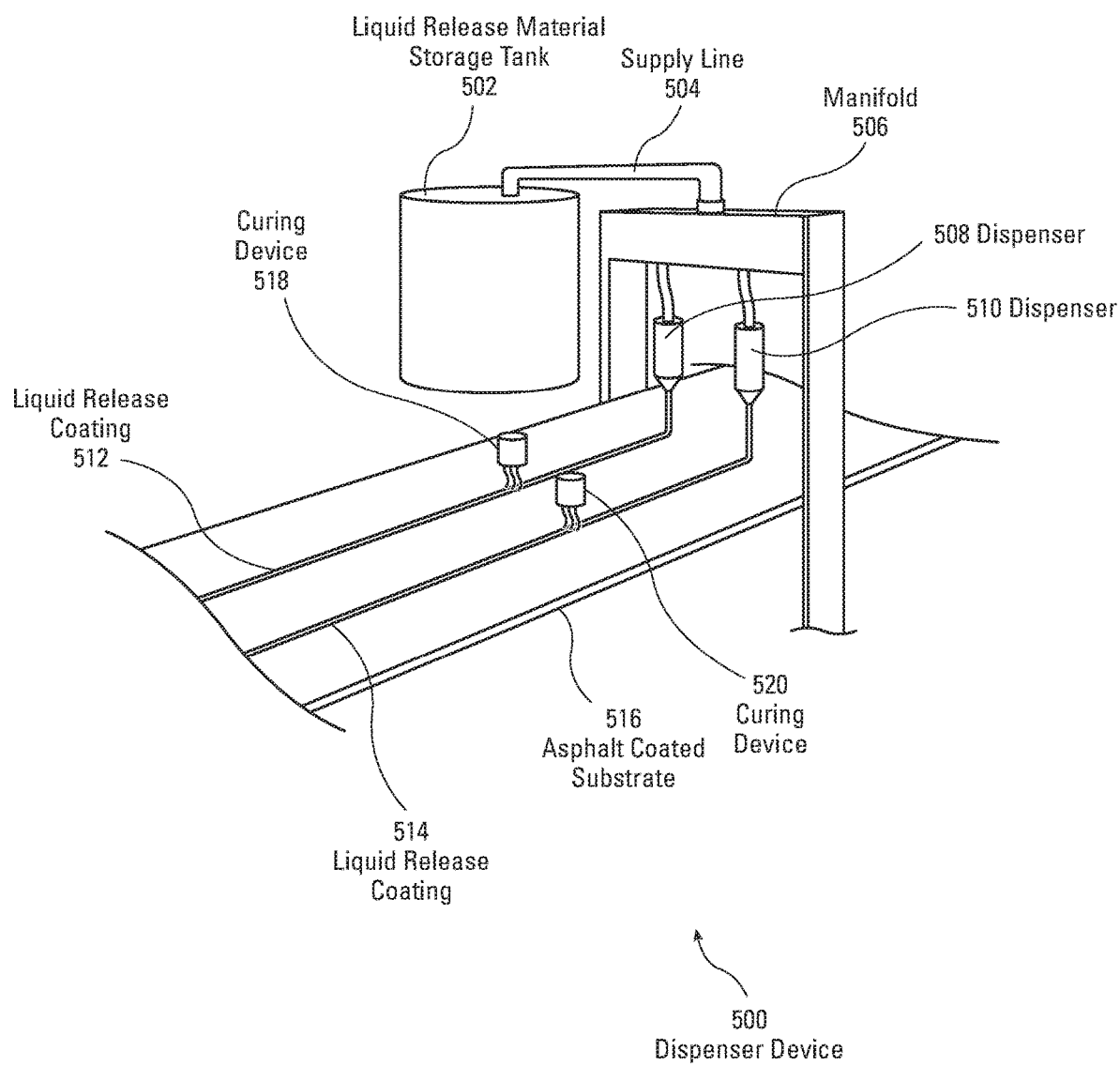
FIG. 5 is the embodiment illustrated in FIG. 4, which further includes two curing devices.

FIG. 5 is a schematic perspective view of a dispenser device 500 that is similar to the Dispenser 400 of FIG. 4. As illustrated in FIG. 5, the asphalt coated substrate 516 moves from right to left in FIG. 5. Liquid release storage tank 502 stores the liquid release material which is pumped through the supply line 504 to the manifold 506. Dispenser 508 and dispenser 510 are connected to the manifold 506 and spray or extrude the liquid release material to form liquid release coating 512 and liquid release coating 514. Although the liquid release coatings 512, 514 are shown as stripes, they can be deposited in any desired geometry. Curing devices 518, 520 cure the liquid release coatings 512, 514. Again, the curing devices 518, 520 can comprise any type of curing device that works for the particular liquid release coating utilized, such as hot air, IR radiation, UV radiation or other type of curing device.

Consequently, the embodiments of the present invention disclose a manner of depositing a release material on a shingle as part of the shingle manufacturing line, which provides for full automation and eliminates the necessity for operator interaction for tape changes, thereby eliminating additional waste of the tape material. The release material, once it is cured, provides a higher quality release material than the PET release tape and can be applied at a location that is farther down the process line where the environment is less harsh to achieve higher accuracy in the placement of the release material. The release material can be better aligned on the shingle when the release material is applied at a location that is farther displaced from the application of the asphalt on the substrate and can be applied directly over fines on the shingle surface. The superior adherence of the liquid release material to the shingle surface and the increased releasability of the liquid release material, compared to the PET tape, results in a higher quality product shingle.

What is claimed is:

1. A system for applying a release material to a shingle during manufacturing of said shingle comprising:
    an asphalt coater that coats both a top surface and a bottom surface of a substrate with asphalt to form a top surface of said shingle and a bottom surface of said shingle;
    a liquid release material that comprises a liquid or gel silicon polymer emulsion that cures as a waterproof elastic film;
    a storage tank that stores said liquid release material;
    at least one dispenser connected to said storage tank that has a shape that dispenses said liquid release material in selected designs at specific locations on said top surface of said shingle or said bottom surface of said shingle that align with adhesive on an adjacent shingle when said shingle is placed in a bundle;
    a fines applicator that dispenses lines on said top surface or said bottom surface, or both said top surface and said bottom surface of said shingles, including said specific locations on said top surface or said bottom surface, or both said top surface and said bottom surface.

2. The system of claim 1 wherein said dispensers comprise sprayers.

3. The system of claim 1 further comprising:
    at least one curing device disposed to cure said liquid release material to form a waterproof, heat resistant elastic film.

4. The system of claim 3 wherein said curing device is an infrared radiation emitter.

5. The system of claim 1 wherein said liquid release material cures from heat from said asphalt.

\* \* \* \* \*